United States Patent
Voss et al.

(10) Patent No.: US 12,118,822 B2
(45) Date of Patent: Oct. 15, 2024

(54) GLOBAL CONFIGURATION INTERFACE FOR DEFAULT SELF-IMAGES

(71) Applicant: Snap Inc., Santa Monica, CA (US)

(72) Inventors: Jeremy Voss, Los Angeles, CA (US); Dallin Dyer, Saratoga Springs, UT (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/197,336

(22) Filed: May 15, 2023

(65) Prior Publication Data
US 2023/0282025 A1    Sep. 7, 2023

Related U.S. Application Data

(63) Continuation of application No. 17/720,703, filed on Apr. 14, 2022, now Pat. No. 11,688,201, which is a (Continued)

(51) Int. Cl.
*G06V 40/16* (2022.01)
*G06F 21/32* (2013.01)

(52) U.S. Cl.
CPC ........... *G06V 40/169* (2022.01); *G06F 21/32* (2013.01); *G06V 40/176* (2022.01)

(58) Field of Classification Search
CPC .. G06V 40/169; G06V 40/176; G06V 40/172; G06V 40/161; G06V 40/168; G06V 40/174; G06V 40/19; G06V 40/197; G06F 21/32; G06F 16/951; G06F 16/9535; G06F 3/048; G06F 16/00; G06F 21/64; G06F 21/31; G06F 21/6245; G06F 3/0425; G06T 13/80; G06T 7/0012; G06T 1/0021; G06T 11/001; H04N 7/157; H04N 21/41407; H04N 21/4223; H04N 21/4302; H04N 21/44008; H04N 21/44012; H04N 21/44218; H04N 21/4532; H04N 21/4788; H04N 21/84; H04N 21/816; H04M 1/72439; H04M 3/567; H04M 3/42365;
(Continued)

(56) References Cited

U.S. PATENT DOCUMENTS 11,335,121 B2 *  5/2022  Voss ................. H04N 21/44008
11,688,201 B2 *  6/2023  Voss ....................... H04N 21/84
                                                                      382/118
(Continued)

*Primary Examiner* — Nimesh Patel
(74) *Attorney, Agent, or Firm* — Georgiy L. Khayet

(57) ABSTRACT

Systems and methods for operating a messaging system are provided. An example method includes receiving an authorization from a user to enable use of a self-image of a further user in a personalized video, sending, in response to the authorization, the personalized video including at least part of the self-image of the further user and at least part of a stock video to a further computing device associated with the further user, and receiving, from the further computing device, an indication of whether the further user has authorized using the self-image in the personalized video. The method includes receiving a text typed by the user, synthesizing a voice reading or singing the text, and adding the voice to the personalized video. The method includes, prior to sending the personalized video, modifying a voice present in the personalized video to match the voice of the user.

20 Claims, 17 Drawing Sheets

Related U.S. Application Data continuation of application No. 16/836,059, filed on Mar. 31, 2020, now Pat. No. 11,335,121.

(58) Field of Classification Search
CPC ......... H04M 2201/38; H04M 2201/42; H04M 1/72454; H04M 1/72457; G06Q 50/01; G06Q 20/384; G06Q 20/401; G06Q 20/40; H04L 67/535; H04L 9/40; H04L 51/52; H04L 63/0428

See application file for complete search history.

(56) References Cited

U.S. PATENT DOCUMENTS

| | | | |
|---|---|---|---|
| 2006/0123113 A1* | 6/2006 | Friedman | H04L 12/1822 709/226 |
| 2014/0019533 A1* | 1/2014 | Sherman | G06Q 10/10 709/204 |
| 2016/0225301 A1* | 8/2016 | Scepanovic | G09G 3/20 |
| 2017/0004646 A1* | 1/2017 | Phillipps | G06T 13/80 |
| 2019/0082211 A1* | 3/2019 | Vats | G06T 7/215 |

* cited by examiner

GLOBAL CONFIGURATION INTERFACE FOR DEFAULT SELF-IMAGES

CROSS-REFERENCE TO RELATED APPLICATION

This application is a Continuation of and claims the priority benefit of U.S. patent application Ser. No. 17/720,703, entitled "GLOBAL CONFIGURATION INTERFACE FOR DEFAULT SELF-IMAGES," filed on Apr. 14, 2022, which in turn is a Continuation of U.S. patent application Ser. No. 16/836,059, entitled "GLOBAL CONFIGURATION INTERFACE FOR DEFAULT SELF-IMAGES," filed on Mar. 31, 2020. The aforementioned Applications are incorporated herein by reference in their entirety for all purposes.

TECHNICAL FIELD

This disclosure generally relates to digital image processing. More particularly, this disclosure relates to methods and systems for interfacing with configurations for a communications system.

BACKGROUND

Sharing media, such as stickers and emojis, has become a standard option in messaging applications. Currently, some of the messengers provide users with an option for generating and sending images and short videos to other users via a communication chat.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
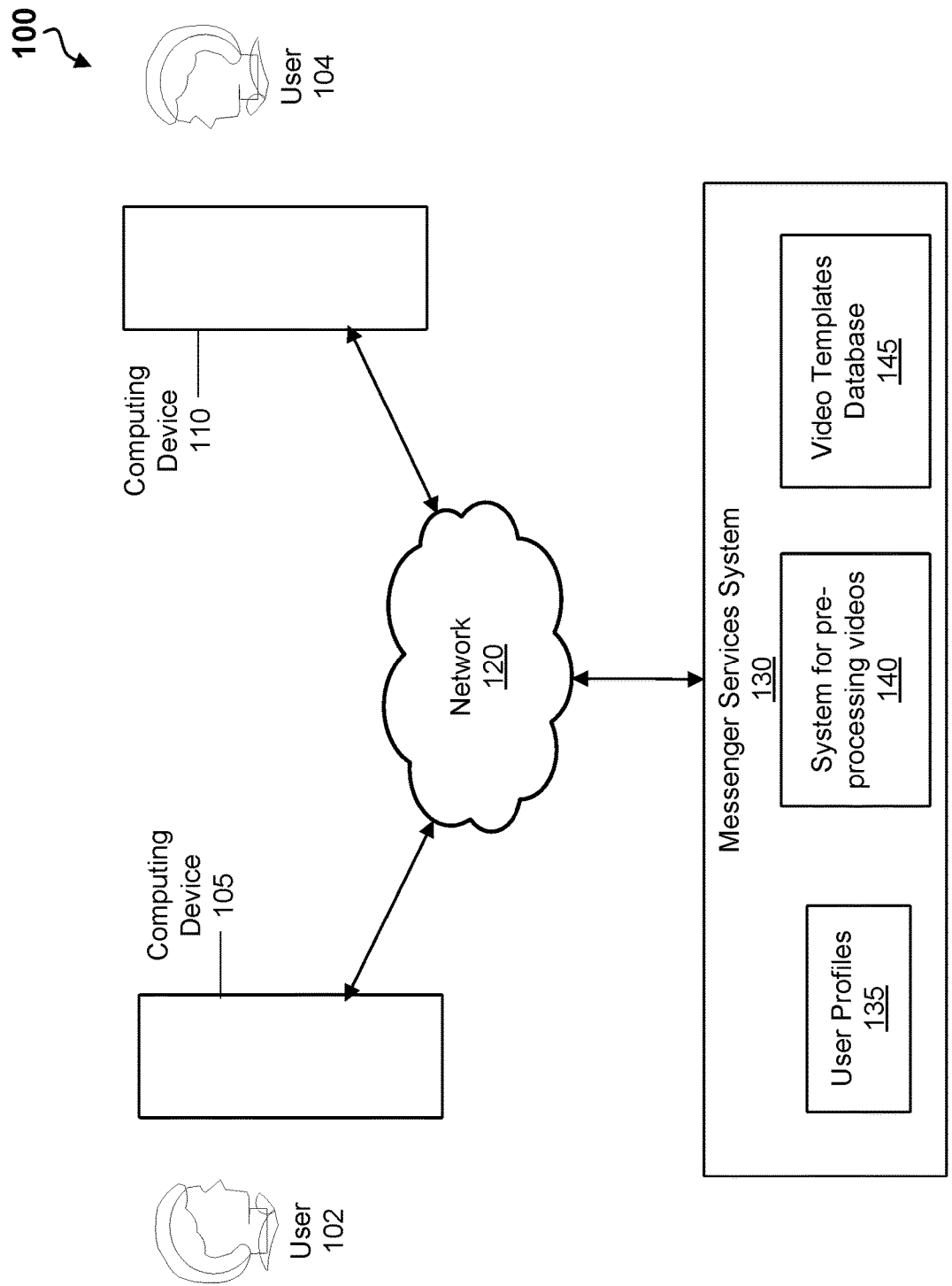
FIG. 1 is a block diagram showing an example environment wherein systems and methods for template-based generation of personalized videos can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to methods and systems for operating a messaging system. The embodiments provided in this disclosure solve at least some issues of known art. The present disclosure can be designed to work on mobile devices, such as smartphones, tablet computers, or mobile phones, in real-time, although the embodiments can be extended to approaches involving a web service or a cloud-based resource. Methods described herein can be implemented by software running on a computer system or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium.

Some embodiments of the disclosure may allow a user to, on a computing device (typically a mobile phone), authorize use of a self-image, or selfie, in a personalized video in which the face of the user is inserted into the video. The face of the user typically, but not necessarily, replaces the face of an actor in the video (also referred to as a stock video, a template, and a template video). The stock video may be an animation video or a live action video. The user may also authorize the use of a friend's selfie in the personalized video (also referred to as a two-person video), and then may send a personalized video having a selfie of the user and their friend inserted into a video.

After authorizing a two-person video, the user's mobile device may send the user's selfie to the friend's mobile device so that the friend can also send personalized videos with the user's selfie, as well as their own.

The user may revoke their authorization for using their selfie in their own or their friend's modified videos and may also delete their selfie in the application on their own mobile device, as well as send instructions for the friend's mobile device to delete the user's selfie. Likewise, in response to the friend's revocation of authorization for two-person videos, a command from the friend's mobile device to delete the friend's selfie may be received, and the user's device may then delete the friend's selfie.

A software application according to the present technology may also suggest possible partners for two-person videos. The suggestions may be based on a user social graph, a recipient/sender of a most recent communication, a most common recipient/sender of communications, or a previous user selection.

Referring now to the drawings, example embodiments are described. The drawings are schematic illustrations of idealized example embodiments. Thus, the example embodiments discussed herein should not be understood as limited to the particular illustrations presented herein; rather, these example embodiments can include deviations and differ from the illustrations presented herein as shall be evident to those skilled in the art.

FIG. 1 shows an example environment 100, in which a system and a method for template-based generation of personalized videos can be implemented. The environment 100 may include a computing device 105, a user 102, a computing device 110, a user 104, a network 120, and a messenger services system 130. The computing device 105 and computing device 110 can refer to a mobile device such as a mobile phone, smartphone, or tablet computer. In further embodiments, the computing device 110 can refer to a personal computer, laptop computer, netbook, set top box, television device, multimedia device, personal digital assistant, game console, entertainment system, infotainment system, vehicle computer, or any other computing device.

The computing device 105 and the computing device 110 can be communicatively connected to messenger services system 130 via the network 120. The messenger services system 130 can be implemented as a cloud-based computing resource(s). The messenger services system 130 can include computing resource(s) (hardware and software) available at a remote location and accessible over a network (e.g., the Internet). The cloud-based computing resource(s) can be shared by multiple users and can be dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the computing device 105 can be configured to enable a communication chat between the user 102 and the user 104 of the computing device 110. During the communication chat, the user 102 and the user 104 may exchange text messages and videos. The videos may include personalized videos. The personalized videos can be generated based on pre-generated video templates stored in the computing device 105 or the computing device 110. In some embodiments, the pre-generated video templates can be stored in the messenger services system 130 and downloaded to the computing device 105 or the computing device 110 on demand.

The messenger services system 130 may include a system 140 for pre-processing videos. The system 140 may generate video templates based on animation videos or live action videos. The messenger services system 130 may include a video templates database 145 for storing the video templates. The video templates can be downloaded to the computing device 105 or the computing device 110.

The messenger services system 130 may be also configured to store user profiles 135. The user profiles 135 may include images of the face of the user 102, images of the face of the user 104, and images of faces of other persons. The images of the faces can be downloaded to the computing device 105 or the computing device 110 on demand and based on permissions. Additionally, the images of the face of the user 102 can be generated using the computing device 105 and stored in a local memory of the computing device 105. The images of the faces can be generated based on other images stored in the computing device 105. The images of the faces can be further used by the computing device 105 to generate personalized videos based on the pre-generated video templates. Similarly, the computing device 110 may be used to generate images of the face of the user 104. The images of the face of the user 104 can be used to generate personalized videos on the computing device 110. In further embodiments, the images of the face of user 102 and images of the face of the user 104 can be mutually used to generate personalized videos on the computing device 105 or the computing device 110.

Figure 2:
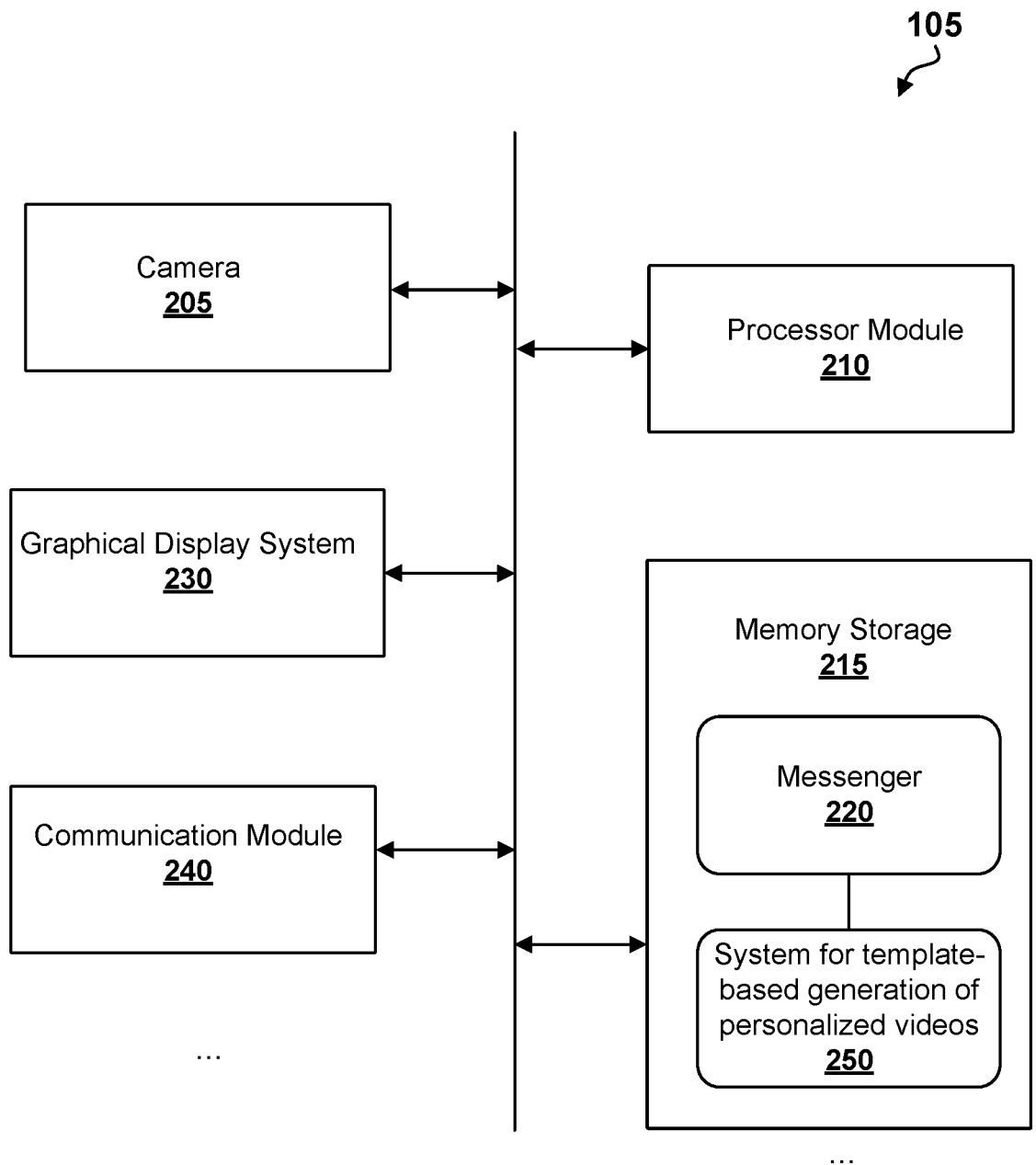
FIG. 2 is a block diagram showing an example embodiment of a computing device for implementing methods for template-based generation of personalized videos.

FIG. 2 is a block diagram showing an example embodiment of a computing device 105 (or computing device 110) for implementing methods for personalized videos. In the example shown in FIG. 2, the computing device 110 includes both hardware components and software components. Particularly, the computing device 110 includes a camera 205 or any other image-capturing device or scanner to acquire digital images. The computing device 110 can further include a processor module 210 and a memory storage 215 for storing software components and processor-readable (machine-readable) instructions or codes, which when performed by the processor module 210 cause the computing device 105 to perform at least some steps of methods for template-based generation of personalized videos as described herein. The computing device 105 may include a graphical display system 230 and a communication module 240. In other embodiments, the computing device 105 may include additional or different components. Moreover, the computing device 105 can include fewer components that perform functions similar or equivalent to those depicted in FIG. 2.

The computing device 110 can further include a messenger 220 for enabling communication chats with another computing device (such as the computing device 110) and a system 250 for template-based generation of personalized videos. The system 250 is described in more detail below with reference to FIG. 4. The messenger 220 and the system 250 may be implemented as software components and processor-readable (machine-readable) instructions or codes stored in the memory storage 215, which when performed by the processor module 210 cause the computing device 105 to perform at least some steps of methods for providing communication chats and generation of personalized videos as described herein.

In some embodiments, the system 250 for template-based generation of personalized videos can be integrated in the messenger 220. A user interface of the messenger 220 and the system 250 for template-based personalized videos can be provided via the graphical display system 230. The communication chats can be enabled via the communication module 240 and the network 120. The communication module 240 may include a GSM module, a WiFi module, a Bluetooth™ module, and so forth.

Figure 3:
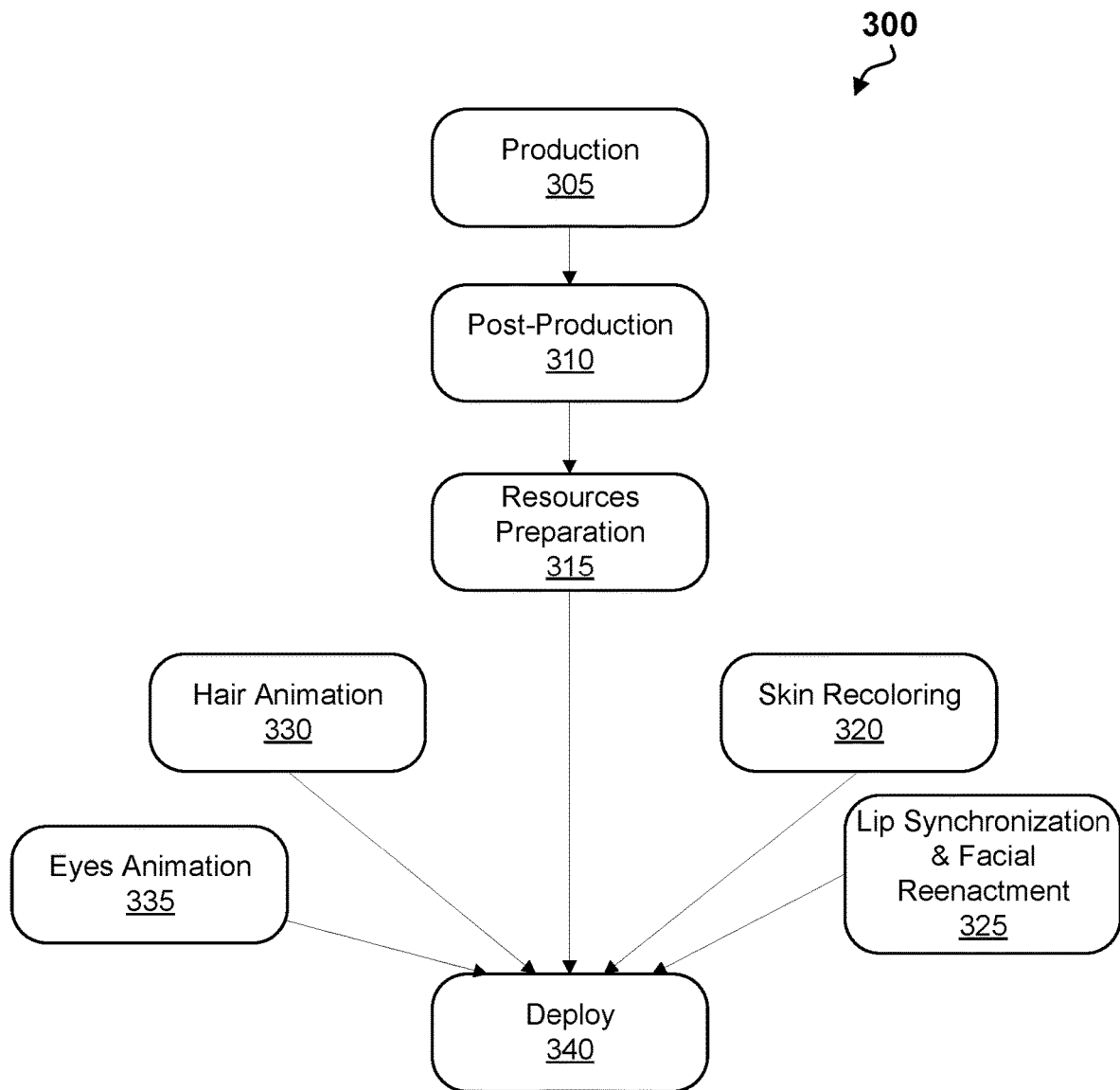
FIG. 3 is a flow chart showing a process for template-based generation of personalized videos, according to some example embodiments of the disclosure.

FIG. 3 is a flow chart showing steps of a process 300 for template-based generation of personalized videos, according to some example embodiment of the disclosure. The process 300 may include production 305, post-production 310, resources preparation 315, skin recoloring 320, lip synchronization and facial reenactment 325, hair animation 330, eyes animation 335, and deploy 340. The resources preparation 315 can be performed by the system 140 for pre-processing videos in the messenger services system 130 (shown in FIG. 1). The resources preparation 315 results in generating video templates that may include video configuration data.

The skin recoloring 320, lip synchronization and facial reenactment 325, hair animation 330, eyes animation 335, and deploy 340 can be performed by the system 250 for template-based generation of personalized videos in computing device 105 (shown in FIG. 2). The system 250 may receive an image of the user's face and video configuration data and generate a personalized video featuring the user's face.

The skin recoloring 320, lip synchronization and facial reenactment 325, hair animation 330, eyes animation 335, and deploy 340 can be also performed by the system 140 for pre-processing videos in messenger services system 130. The system 140 can receive test images of user faces and a video configuration file. The system 140 may generate test personalized videos featuring the user faces. The test personalized videos can be reviewed by an operator. Based on a result of the review, the video configuration file can be stored in the video templates database 145 and can then be downloaded to the computing device 105 or computing device 110.

The production 305 may include idea and scenario creation, pre-production during which a location, props, actors, costumes, and effects are identified, and production itself, which can require one or more recording sessions. In some example embodiments, the recording may be performed by recording a scene/actor on a chroma key background, also referred herein to as a green screen or chroma key screen. To allow the subsequent head tracking and resources clean-up, the actors may wear chroma key face masks (e.g., balaclavas) with tracking marks that cover the face of the actors, but leave the neck and the bottom of the chin open. The idea and scenario creation are shown in detail in FIG. 5.

In an example embodiment, the steps of pre-production and subsequent production 305 are optional. Instead of recording an actor, two-dimensional (2D) or three-dimensional (3D) animation may be created or third-party footages/images may be used. Furthermore, an original background of the image of the user may be used.

Figure 4:
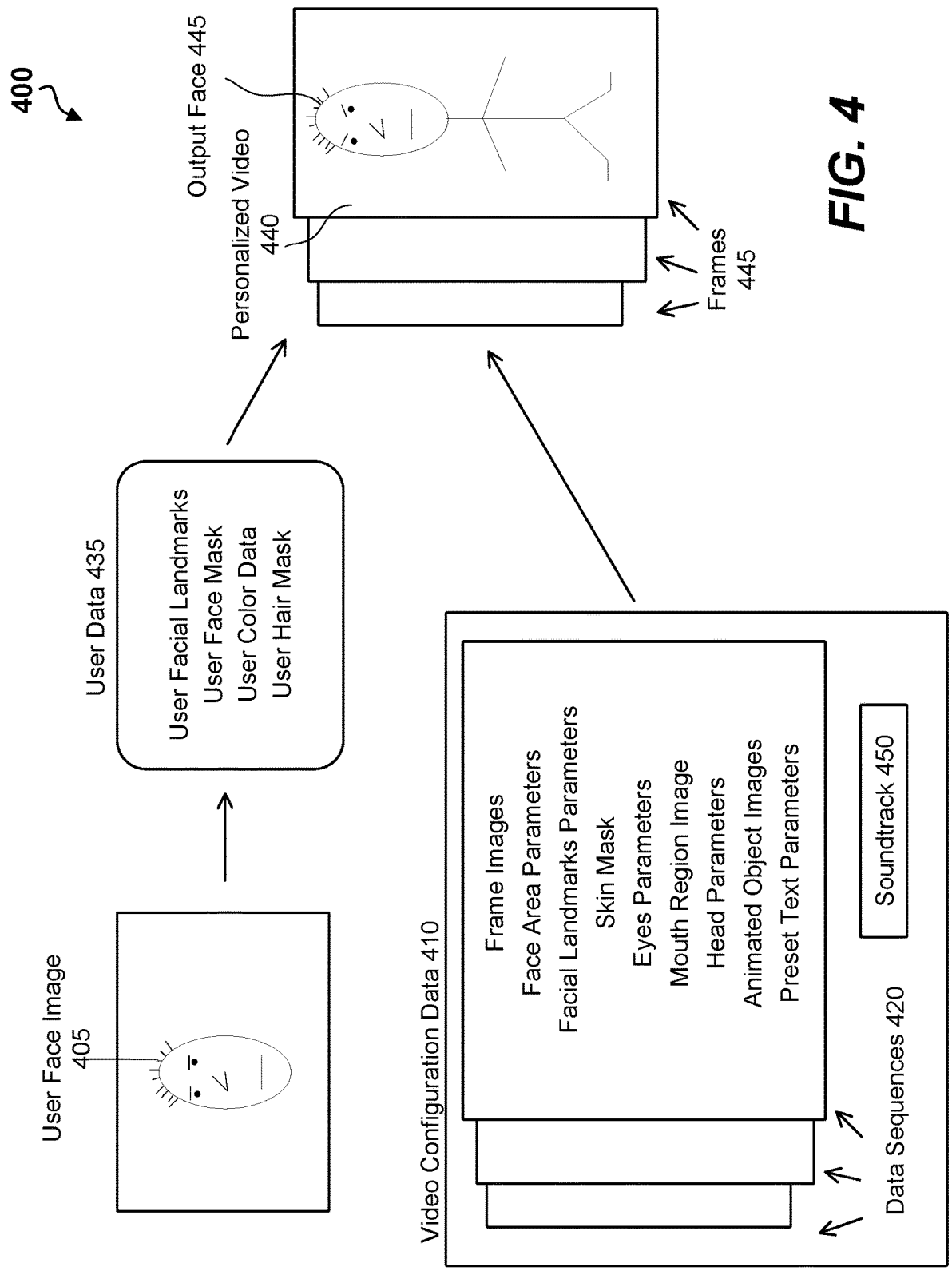
FIG. 4 is a flow chart showing functionality of a system for template-based generation of the personalized videos, according to some example embodiments of the disclosure.

FIG. 4 is a schematic showing functionality 400 of the system 250 for template-based generation of the personalized videos, according to some example embodiments. The system 250 may receive an image of a source face shown as a user face image 405 and a video template including video configuration data 410. The video configuration data 410 may include data sequences 420. For example, the video configuration data 410 may include a sequence of frame images, a sequence of face area parameters defining positions of a face area in the frame images, and a sequence of facial landmark parameters defining positions of facial landmarks in the frame images. Each of the facial landmark parameters may correspond to a facial expression. The sequence of frame images may be generated based on an animation video or based on a live action video. The sequence of facial landmark parameters may be generated based on a live action video featuring a face of a facesync actor. The video configuration data 410 may further include a skin mask, eyes parameters, a mouth region image, head parameters, animated object images, preset text parameters, and so forth. The video configuration data may include a sequence of skin masks defining a skin area of a body of at least one actor featured in the frame images. In an example embodiment, the video configuration data 410 may further include a sequence of mouth region images. Each of the mouth region images may correspond to at least one of the frame images. In a further example embodiment, the video configuration data 410 may include a sequence of eye parameters defining positions of an iris in a sclera of a facesync actor featured in the frame images or a sequence of head parameters defining a rotation, a turn, a scale, and other parameters of a head. In another example embodiment, the video configuration data 410 may further include a sequence of animated object images. Each of the animated object images may correspond to at least one of the frame images. The video configuration data 410 may further include a soundtrack 450.

The system 250 may determine, based on the user face image 405, user data 435. The user data may include user facial landmarks, a user face mask, user color data, a user hair mask, and so forth.

The system 250 may generate, based on the user data 435 and the data sequences 420, frames 445 of an output video shown as a personalized video 440. The system 250 may further add the soundtrack to the personalized video 440. The personalized video 440 may be generated by modifying a frame image of the sequence of frame images. The modifying of the frame image may include modifying the user face image 405 to obtain a further image featuring the source face adopting a facial expression corresponding to the facial landmark parameters. The modification may be performed based on facial landmark parameters corresponding to the frame image. The further image may be inserted into the frame image at a position determined by face area parameters corresponding to the frame image. In an example embodiment, the generation of the output video may further include determining color data associated with the source face and, based on the color data, recoloring the skin area in the frame image. Additionally, the generation of the output video may include inserting, into the frame image, a mouth region corresponding to the frame image. Further steps of the generation of the output video may include generating an image of an eyes region based on the eye parameters corresponding to the frame and inserting the image of the eyes region in the frame image. In an example embodiment, the generation of the output video may further include determining a hair mask based on the source face image, generating a hair image based on the hair mask and head parameters corresponding to the frame image, and inserting the hair image into the frame image. Additionally, the generation of the output video may include inserting, into the frame image, an animated object image corresponding to the frame image.

Figure 5:
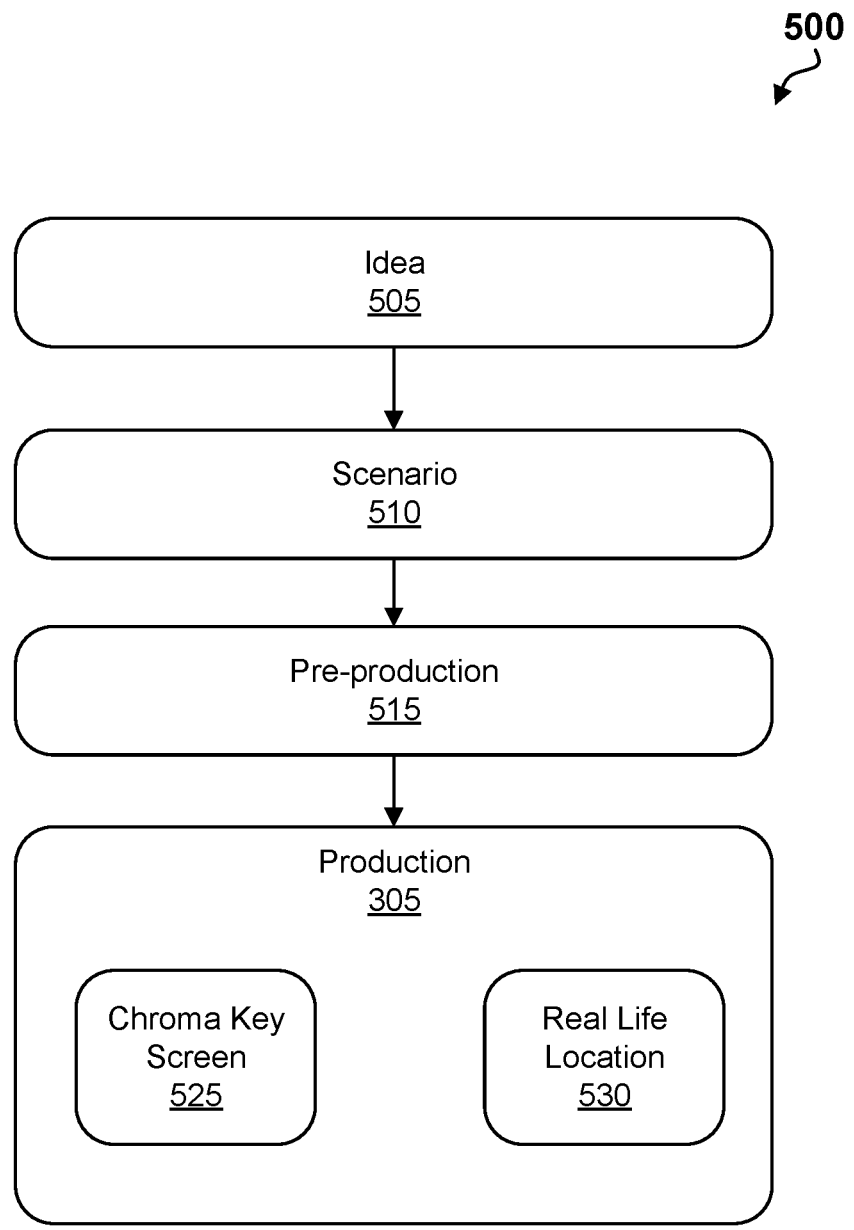
FIG. 5 is a flow chart showing a process of generation of live action videos for use in the generation of video templates, according to some example embodiments.

FIG. 5 is a block diagram showing a process 500 of generating live action videos. The live action videos can be further used to generate video templates for generation of personalized video. The process 500 may include generating an idea at step 505 and creating a scenario at step 510. The process 500 may continue with pre-production at step 515, which is followed by production 305. The production 305 may include recording using a chroma key screen 525 or at a real life location 530.

Figure 6:
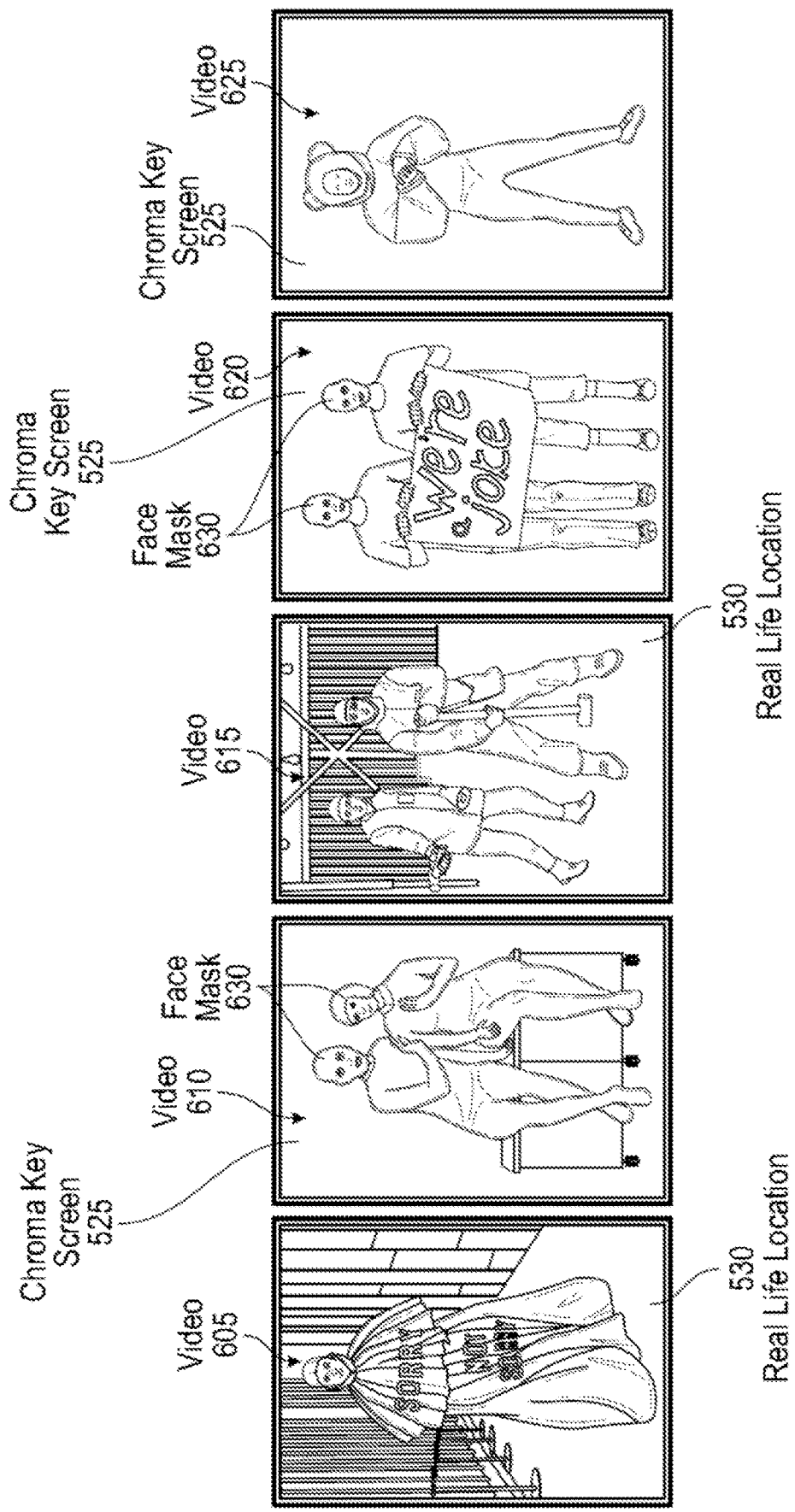
FIG. 6 shows frames of example live action videos for generating video templates, according to some example embodiments.

FIG. 6 shows frames of example live action videos for generating video templates. Frames for video 605 and video 615 are recorded at a real life location 530. Frames for video 610, video 620, and video 625 are recorded using a chroma key screen 525. The actors may wear chroma key face masks 630 with tracking marks that cover the face of the actors.

The post-production 310 may include video editing or animation, visual effects, clean-up, sound design, and voice over recording.

During the resources preparation 315, the resources prepared for further deploy may include the following components: a background footage without a head of an actor (i.e., preparing a cleaned-up background where the head of the actor is removed); a footage with an actor on a black background (only for recorded personalized videos); a foreground sequence of frames; an example footage with a generic head and soundtrack; coordinates for head position, rotation, and scale; animated elements that are attached to the head (optional); soundtracks with and without a voice-over; a voice-over in a separate file (optional); and so forth. All of these components are optional and may be rendered in different formats. The number and configuration of the components depends on the format of the personalized video. For example, a voice-over is not needed for customized personalized videos, background footages and head coordinates are not needed if the original background from a picture of the user is used, and so forth. In an example embodiment, the area where the face needs to be located may be indicated (e.g., manually) instead of preparing a file with coordinates.

The skin recoloring 320 allows to match the color of a skin of the actor in the personalized video to the color of a face on an image of the user. To implement this step, skin masks that indicate specifically which part of a background has to be recolored may be prepared. It may be preferable to have a separate mask for each body part of the actor (neck, left and right hands, etc.).

Figure 7:
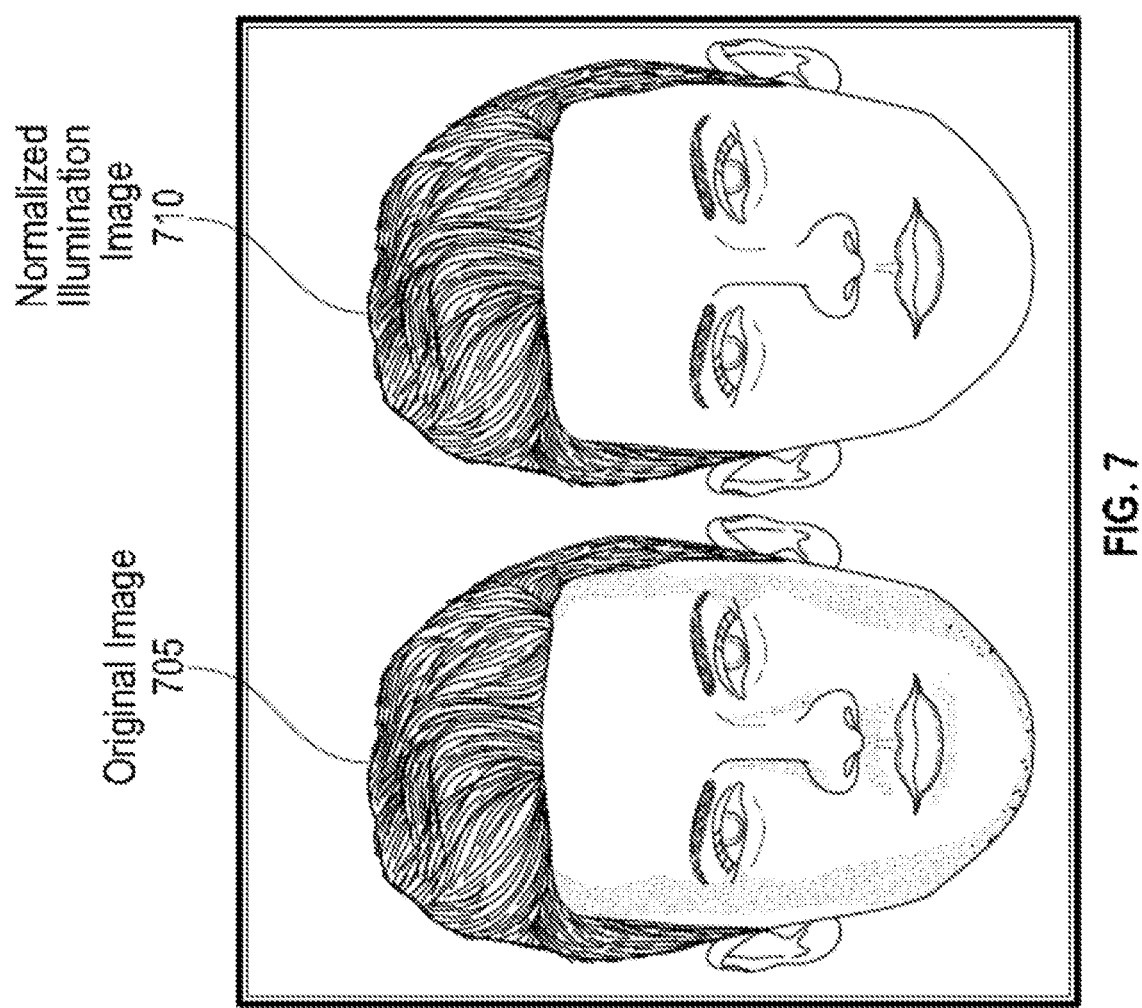
FIG. 7 shows an original image of a face and an image of the face with normalized illumination, according to an example embodiment.

The skin recoloring 320 may include facial image illumination normalization. FIG. 7 shows an original image 705 of a face and an image 710 of the face with normalized illumination, according to an example embodiment. Shadows or highlights caused by uneven illumination affect color distribution and may lead to too dark or too light of a skin tone after recoloring. To avoid this, shadows and highlights in the face of the user may be detected and removed. The facial image illumination normalization process includes the following steps. An image of a face of the user may be transformed using a deep convolutional neural network. The network may receive an original image 705 in the form of a portrait image taken under arbitrary illumination and change the illumination of the original image 705 to make the original image 705 evenly illuminated while keeping the subject in original image 705 the same. Thus, the input of the facial image illumination normalization process includes the original image 705 in the form of the image of the face of the user and facial landmarks. The output of the facial image illumination normalization process includes the image 710 of the face with normalized illumination.

The skin recoloring 320 may include mask creation and body statistics. There may only be a mask for the whole skin or separate masks for body parts. Also, different masks can be created for different scenes in the video (e.g., due to significant illumination change). Masks may be created semi-automatically, e.g., by such technologies as keying, with some human guidance. Prepared masks may be merged into video assets and then used in the recoloring. Also, to avoid unnecessary computations in real-time, color statistics may be calculated for each mask in advance. Statistics may include mean value, median value, standard deviation, and some percentiles for each color channel. Statistics can be computed in Red, Green, Blue (RGB) color space as well as in the other color spaces (Hue, Saturation, Value (HSV) color space, CIELAB color space (also known as CIE L*a*b* or abbreviated as "LAB" color space), etc.). The input of the mask creation process may include grayscale masks for body parts of an actor with uncovered skin in the form of videos or image sequences. The output of the mask creation process may include masks compressed and merged to videos and color statistics per each mask.

Figure 8:
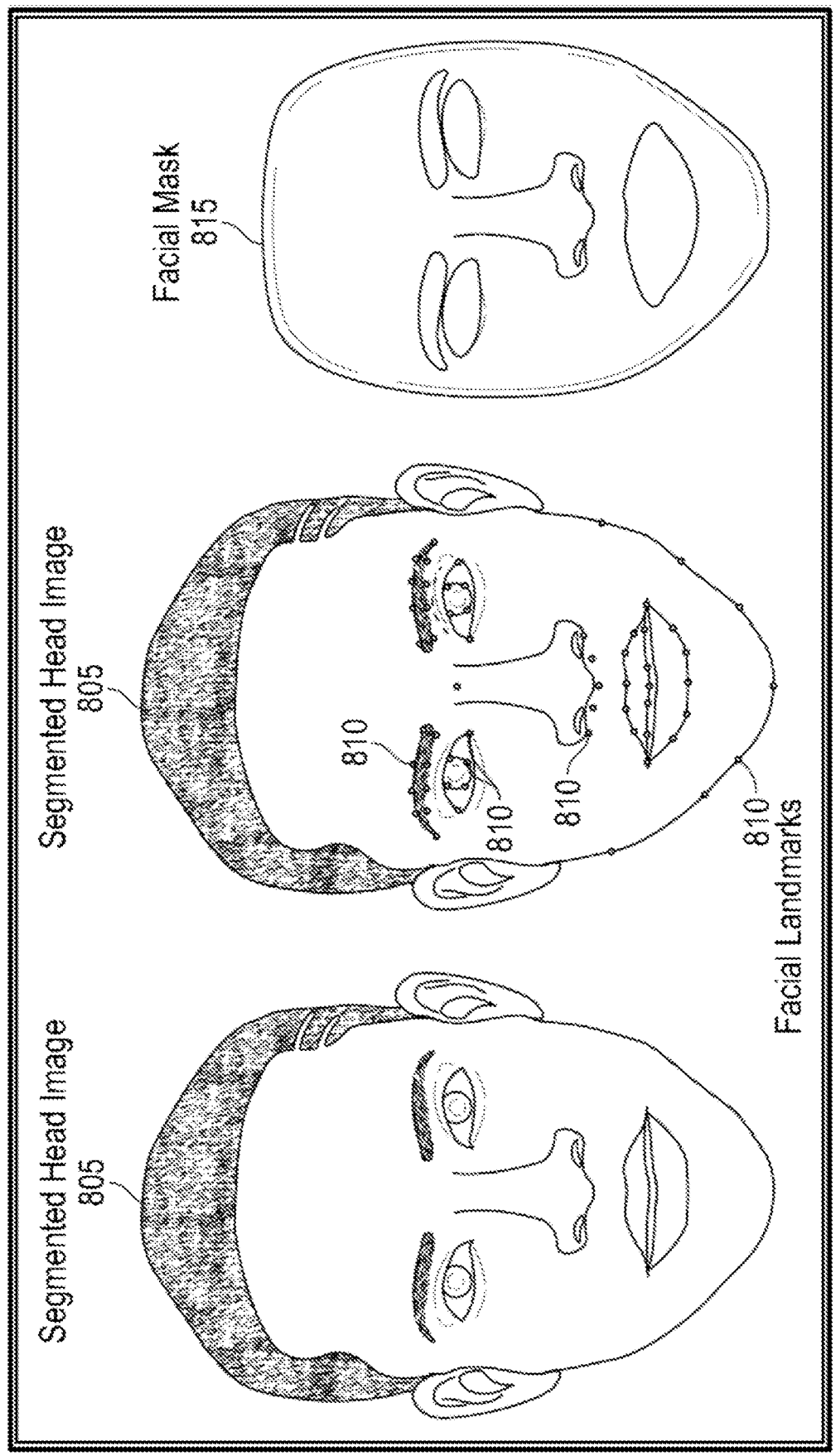
FIG. 8 shows a segmented head image, the head image with facial landmarks, and a facial mask, according to an example embodiment.

The skin recoloring 320 may further include facial statistics computation. FIG. 8 shows a segmented head image 805, the segmented head image 805 with facial landmarks 810, and a facial mask 815, according to an example embodiment. Based on segmentation of the head image of the user and facial landmarks, the facial mask 815 of the user may be created. Regions such as eyes, mouth, hair, or accessories (like glasses) may be not included in the facial mask 815. The segmented head image 805 of the user and the facial mask may be used to compute the statistics for facial skin of the user. Thus, the input of the facial statistics computation may include the segmented head image 805 of the user, facial landmarks 810, and facial segmentation, and the output of the facial statistics computation may include color statistics for the facial skin of the user.

Figure 9:
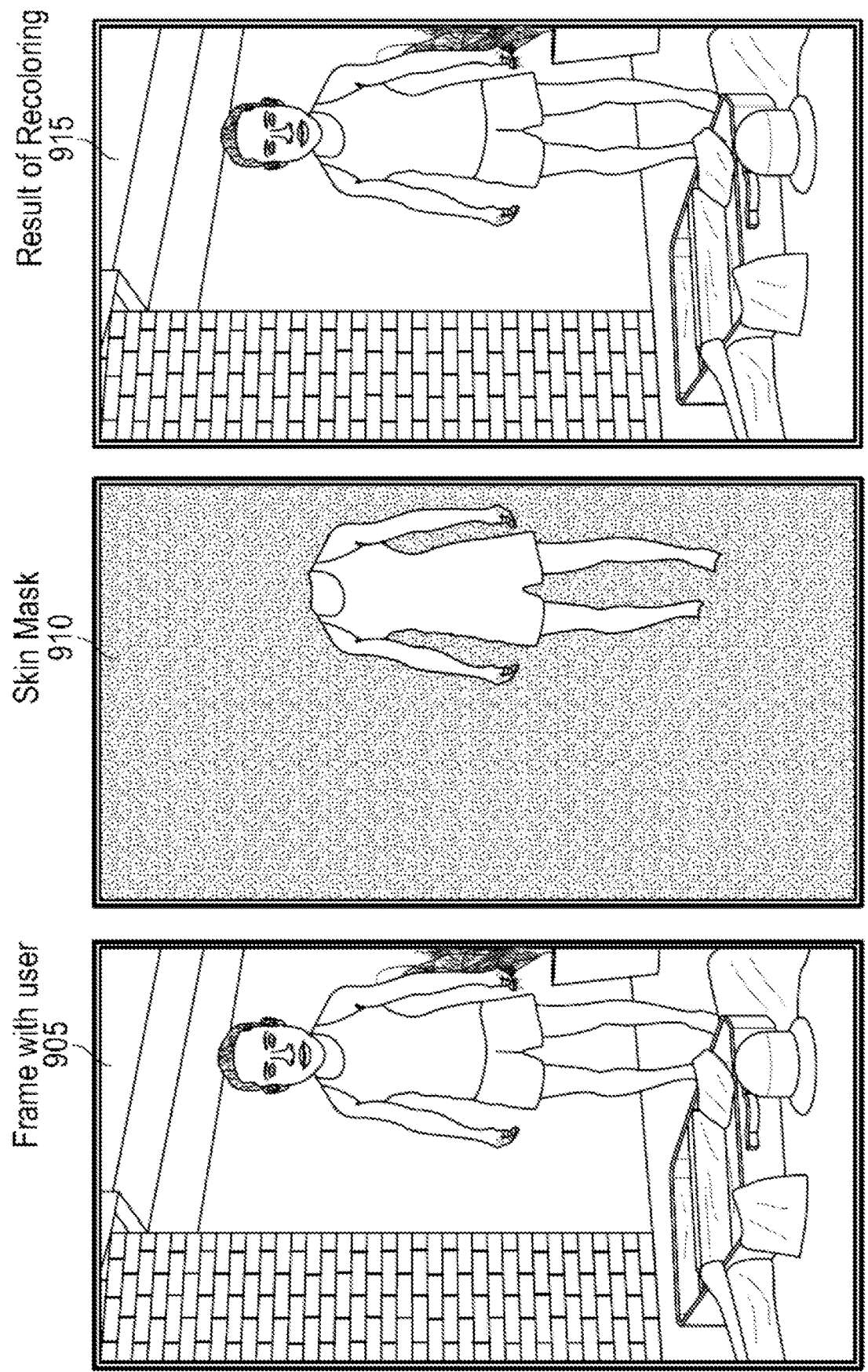
FIG. 9 shows a frame featuring a user face, a skin mask, and a result of recoloring the skin mask, according to an example embodiment.

The skin recoloring 320 may further include skin-tone matching and recoloring. FIG. 9 shows a frame 905 featuring a user face, a skin mask 910, and a result 915 of recoloring the skin mask 910, according to an example embodiment. The skin-tone matching and recoloring may be performed using statistics that describe color distributions in the actor's skin and user's skin, and recoloring of a background frame may be performed in real-time on a computing device. For each color channel, distribution matching may be performed and values of background pixels may be modified in order to make the distribution of transformed values close to the distribution of facial values. Distribution matching may be performed either under assumption that color distribution is normal or by applying techniques like multidimensional probability density function transfer. Thus, the input of the skin-tone matching and recoloring process may include a background frame, actor skin masks for the frame, actor body skin color statistics for each mask, and user facial skin color statistics, and the output may include the background frame with all body parts with uncovered skin recolored.

In some embodiments, to apply skin recoloring 320, several actors with different skin tones may be recorded and then a version of the personalized video that has the closest skin tone to the skin tone of the image of the user may be used.

In an example embodiment, instead of skin recoloring 320, a predetermined lookup table (LUT) may be used to adjust the color of the face to the illumination of a scene. The LUT may be also used to change the color of the face (for example, to make the face green).

Figure 10:
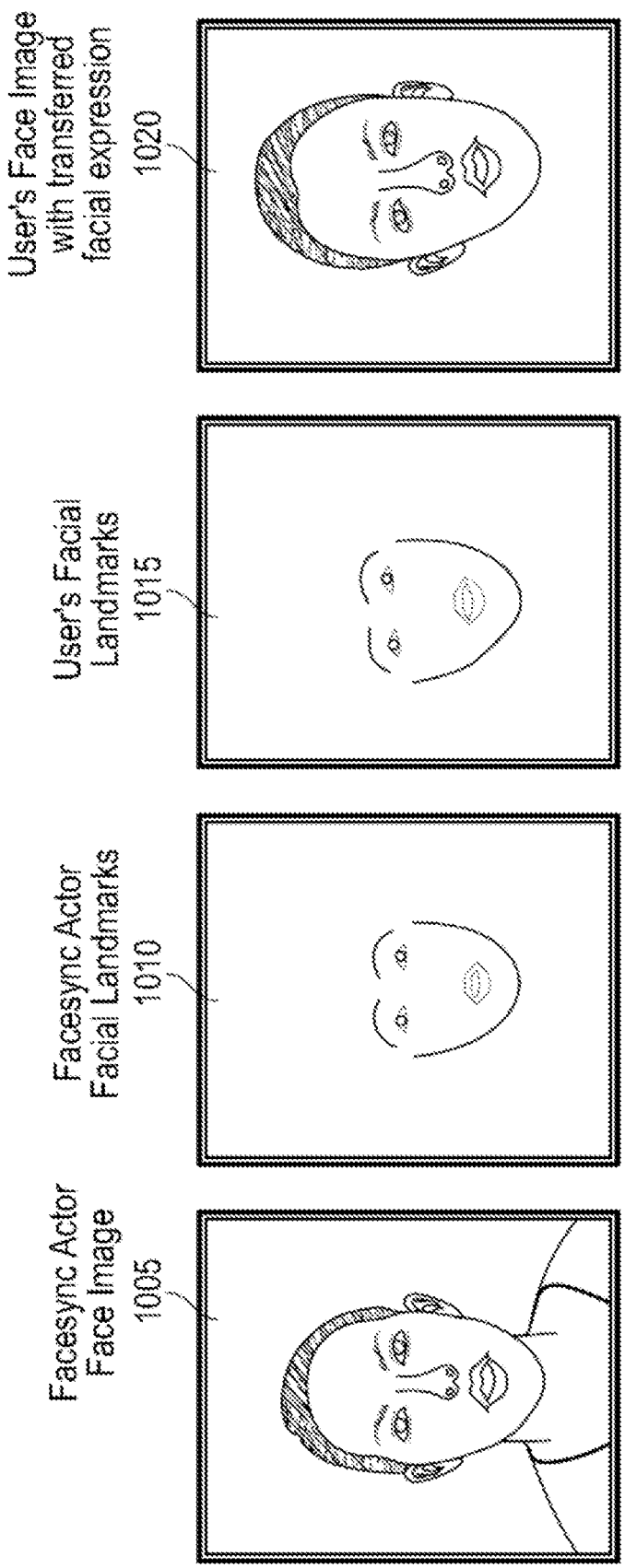
FIG. 10 shows an image of a facial image of a face synchronization actor, an image of the face synchronization actor's facial landmarks, an image of a user's facial landmarks, and image of the user's face with the facial expression of the face synchronization actor, according to an example embodiment.

The lip synchronization and facial reenactment 325 may result in photorealistic face animation. FIG. 10 shows an example process of the lip synchronization and facial reenactment 325. FIG. 10 shows an image 1005 of a facesync actor face, an image 1010 of the facesync actor facial landmarks, an image 1015 of user's facial landmarks, and an image 1020 of the user's face with the facial expression of the facesync actor, according to an example embodiment. The steps of lip synchronization and facial reenactment 325 may include recording a facesync actor and pre-processing a source video/image to obtain the image 1005 of a facesync actor face. Then, the facial landmarks may be extracted as shown by the image 1010 of the facesync actor facial landmarks. This step also may include gaze tracking of the facesync actor. In some embodiments, instead of recording a facesync actor, previously prepared animated 2D or 3D face and mouth region models may be used. The animated 2D or 3D face and mouth region models may be generated by machine learning techniques.

Optionally, fine tuning of the facial landmarks may be performed. In some example embodiments, the fine tuning of the facial landmarks is performed manually. These steps can be performed in a cloud when preparing the video configuration file. In some example embodiments, these steps may be performed during the resources preparation 315. Then, the user's facial landmarks may be extracted as shown by the image 1015 of the user's facial landmarks. The next step of the synchronization and facial reenactment 325 may include animation of the target image with extracted landmarks to obtain the image 1020 of the user's face with the facial expression of the facesync actor. This step may be performed on a computing device based on an image of a face of the user. The method of animation is described in detail in U.S. patent application Ser. No. 16/251,472, the disclosure of which is incorporated herein by reference in its entirety. The lip synchronization and facial reenactment 325 can also be enriched with Artificial Intelligence-made head turns.

In some example embodiments, after the user takes an image, a 3D model of the user's head may be created. In this embodiment, the step of lip synchronization and facial reenactment 325 may be omitted.

Figure 11:
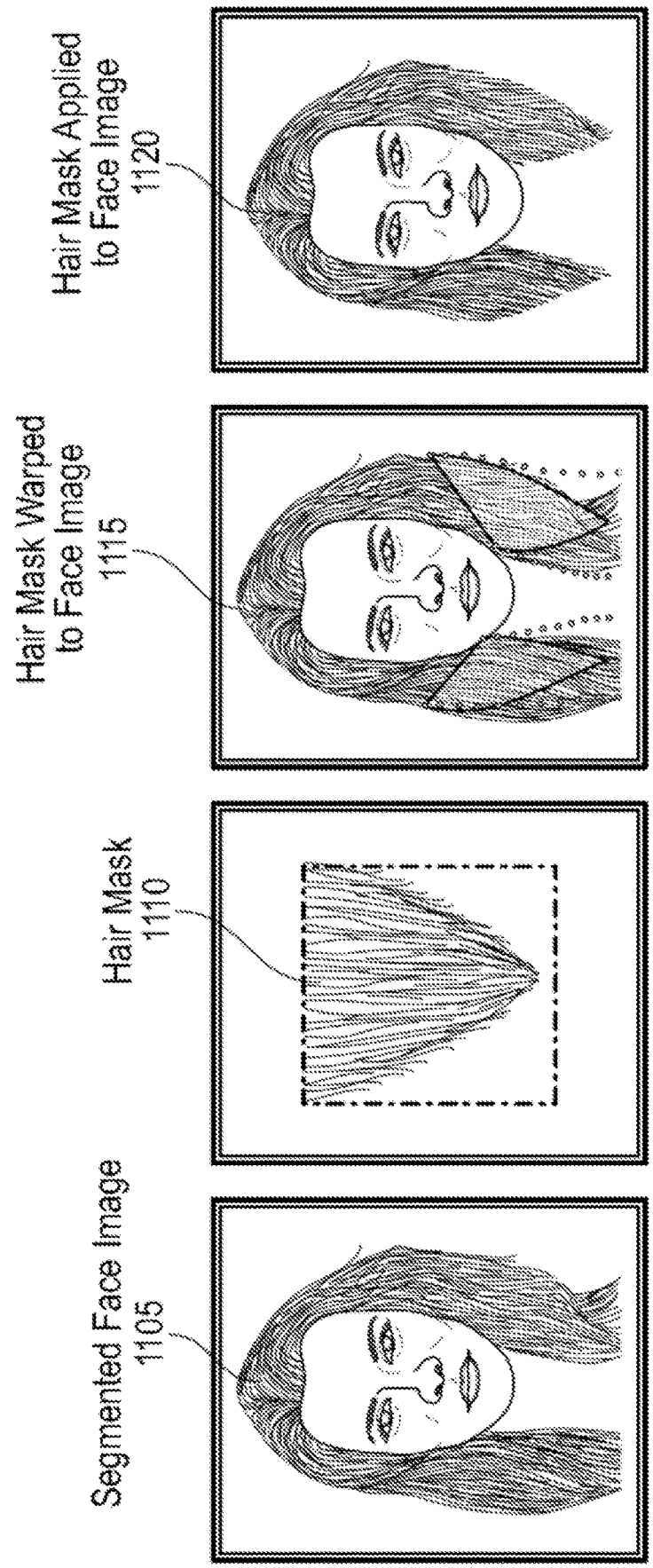
FIG. 11 shows a segmented face image, a hair mask, a hair mask warped to a target image, and the hair mask applied to the target image, according to an example embodiment.

The hair animation 330 may be performed to animate hair of the user. For example, if the user has hair, the hair may be animated when the user moves or rotates his head. The hair animation 330 is shown in FIG. 11. FIG. 11 shows a segmented face image 1105, a hair mask 1110, a hair mask warped to the face image 1115, and the hair mask applied to the face image 1120, according to an example embodiment. The hair animation 330 may include one or more of the following steps: classifying the hair type, modifying appearance of the hair, modifying a hair style, making the hair longer, changing the color of the hair, cutting and animating the hair, and so forth. As shown in FIG. 11, a face image in the form of a segmented face image 1105 may be obtained. Then, a hair mask 1110 may be applied to the segmented face image 1105. The face image 1115 shows the hair mask 1110 warped to the face image. The face image 1120 shows the hair mask 1110 applied to the face image. The hair animation 330 is described in detail in the U.S. patent application Ser. No. 16/551,756, the disclosure of which is incorporated herein by reference in its entirety.

Figure 12:
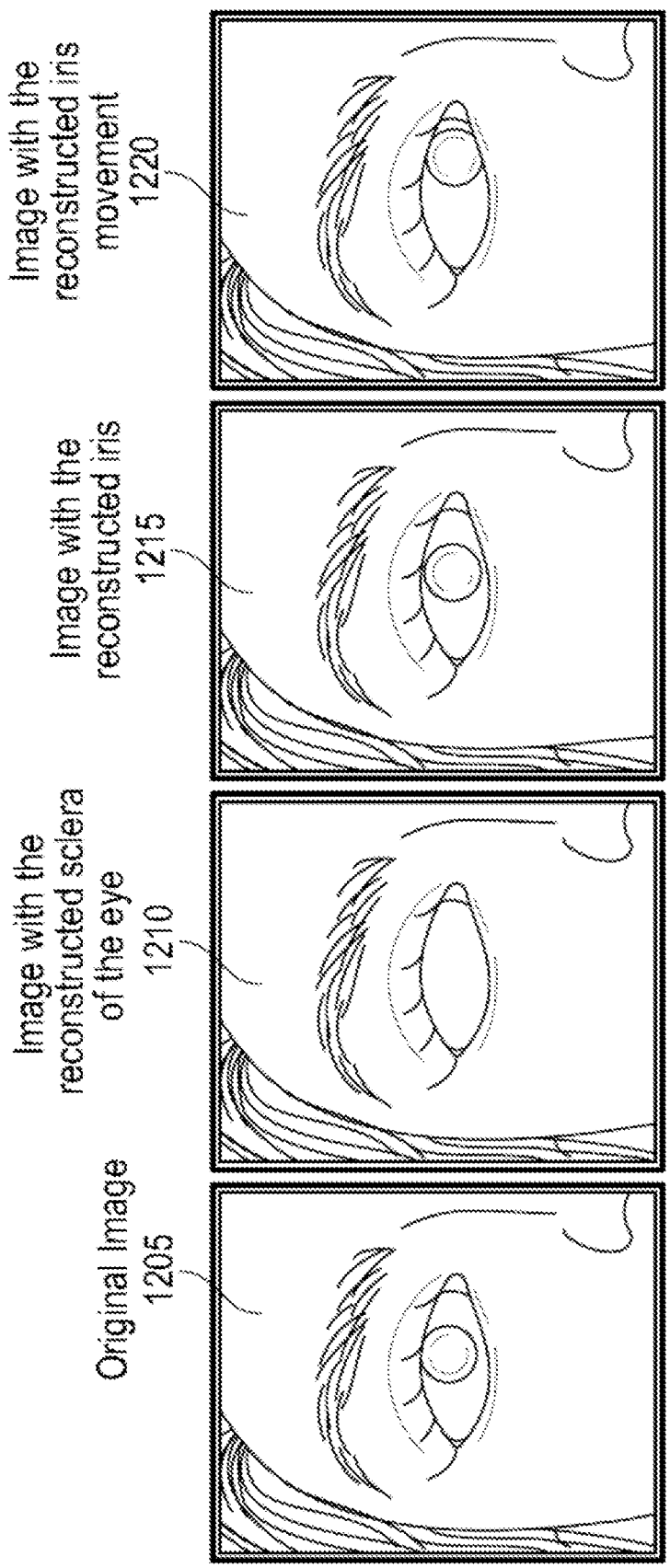
FIG. 12 shows an original image of an eye, an image with reconstructed sclera of the eye, an image with reconstructed iris, and an image with reconstructed moved iris, according to an example embodiment.

The eyes animation 335 may allow making the facial expressions of the user more realistic. The eyes animation 335 is shown in detail in FIG. 12. The process of eyes animation 335 may consist of the following steps: reconstruction of an eye region of the user face, gaze movement step, and eye blinking step. During the reconstruction of the eye region, the eye region is segmented into parts: eyeball, iris, pupil, eyelashes, and eyelid. If some part of the eye region (e.g., iris or eyelid) is not fully visible, the full texture of this part may be synthesized. In some embodiments, a 3D morphable model of an eye may be fitted, and a 3D-shape of the eye may be obtained together with the texture of the eye. FIG. 12 shows an original image 1205 of an eye, an image 1210 with the reconstructed sclera of the eye, and an image 1215 with the reconstructed iris.

The gaze movement step includes tracking a gaze direction and pupil position in a video of a facesync actor. This data may be manually edited if the eye movements of the facesync actor are not rich enough. Gaze movements may then be transferred to the eye region of the user by synthesizing a new eye image with transformed eye shape and the same position of iris as that of the facesync actor. FIG. 12 shows an image 1220 with the reconstructed moved iris.

During the eye blinking step, the visible part of the eye of the user may be determined by tracking the eyes of the facesync actor. A changed appearance of eyelids and eyelashes may be generated based on the reconstruction of eye region.

The steps of the eyes animation 335 may be done either explicitly (as described) or implicitly if face reenactment is done using generative adversarial networks (GAN). In the latter case, the neural network may implicitly capture all the necessary information from the image of the user face and the source video.

During the deploy 340, the user face may be photorealistically animated and automatically inserted in footage templates. The files from the previous steps (resources preparation 315, skin recoloring 320, lip synchronization and facial reenactment 325, hair animation 330, and eyes animation 335) may be used as data for a configuration file. Examples of personalized videos with a predefined set of user faces can be generated for initial review. After the issues that were identified during the review are eliminated, the personalized video may be deployed.

The configuration file may also include a component that allows to indicate the text parameters for customized personalized videos. A customized personalized video is a type of a personalized video that allows users to add any text the users want on top of the final video. The generating of personalized videos with customized text messages is described in more detail in U.S. patent application Ser. No. 16/661,122 dated Oct. 23, 2019, titled "System and Method for Generating Personalized Videos with Customized Text Messages," the disclosure of which is incorporated herein in its entirety.

In an example embodiment, the generation of the personalized videos may further include the steps of generating significant head turns of a user's head; body animation and changing clothes; facial augmentations such as hairstyle changing, beautification, adding accessories, and the like; changing the scene illumination; synthesizing the voice that may read/sing the text that user has typed or changing the voice over tone to match the voice of the user; gender switching; construction of a background and a foreground depending on the user input; and so forth.

Figure 13:
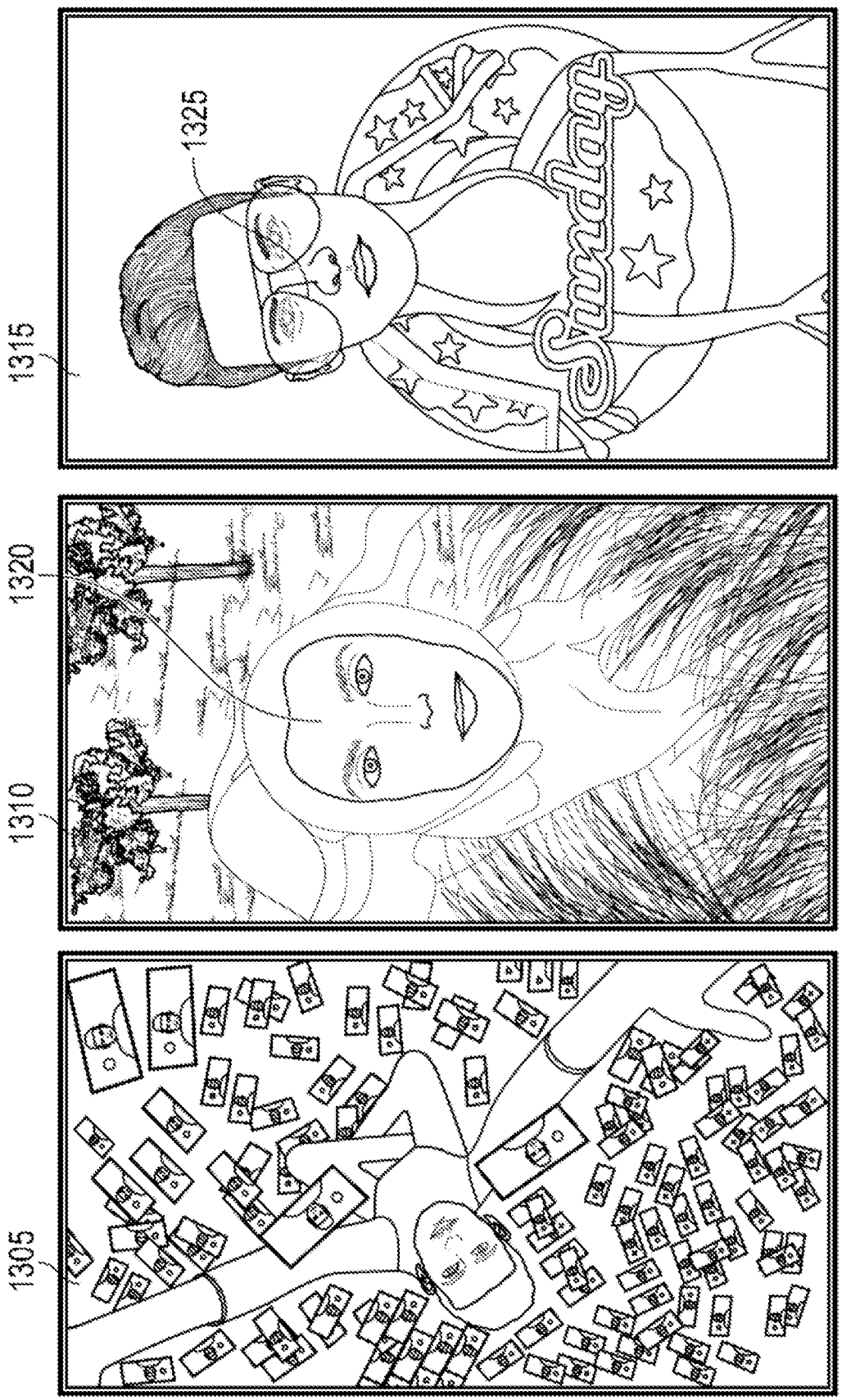
FIGS. 13-14 show frames of example personalized video generated based on video templates, according to some example embodiments.
Figure 14:
Figure 14:
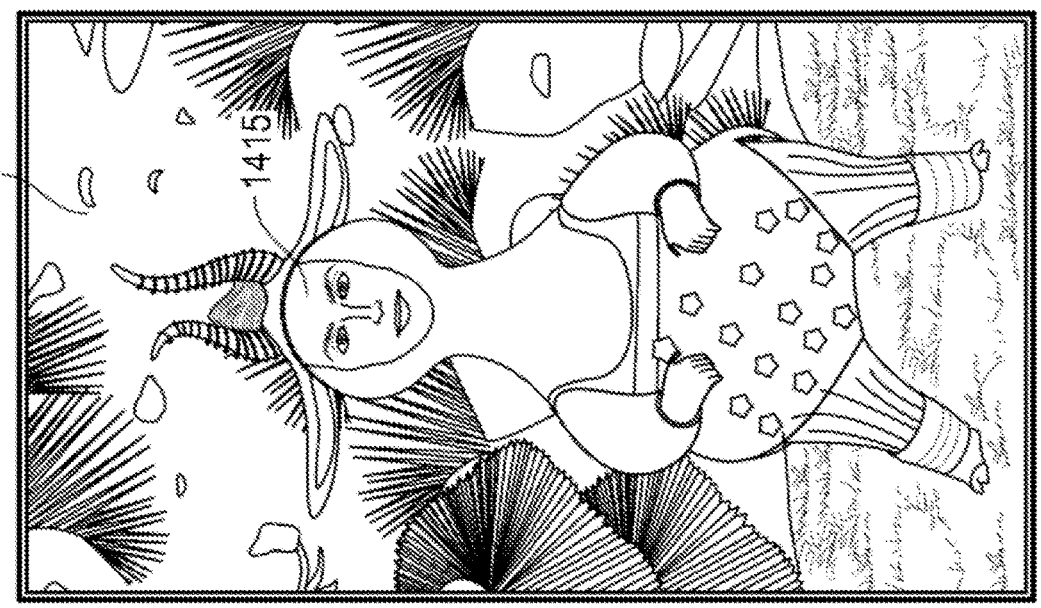

FIGS. 13-14 show frames of example personalized videos generated based on video templates, according to some example embodiments. FIG. 13 shows a filmed personalized video 1305 with an actor, in which the recoloring was performed. FIG. 13 further shows a personalized video 1310 created based on a stock video obtained from a third party. In the personalized video 1310, a user face 1320 is inserted into the stock video. FIG. 13 further shows a personalized video 1315, which is a 2D animation with a user head 1325 added on top of the 2D animation.

FIG. 14 shows a personalized video 1405, which is a 3D animation with a user face 1415 inserted into the 3D animation. FIG. 14 further shows a personalized video 1410 with effects, animated elements 1420, and, optionally, text added on top of the image of the user face.

Figure 15:
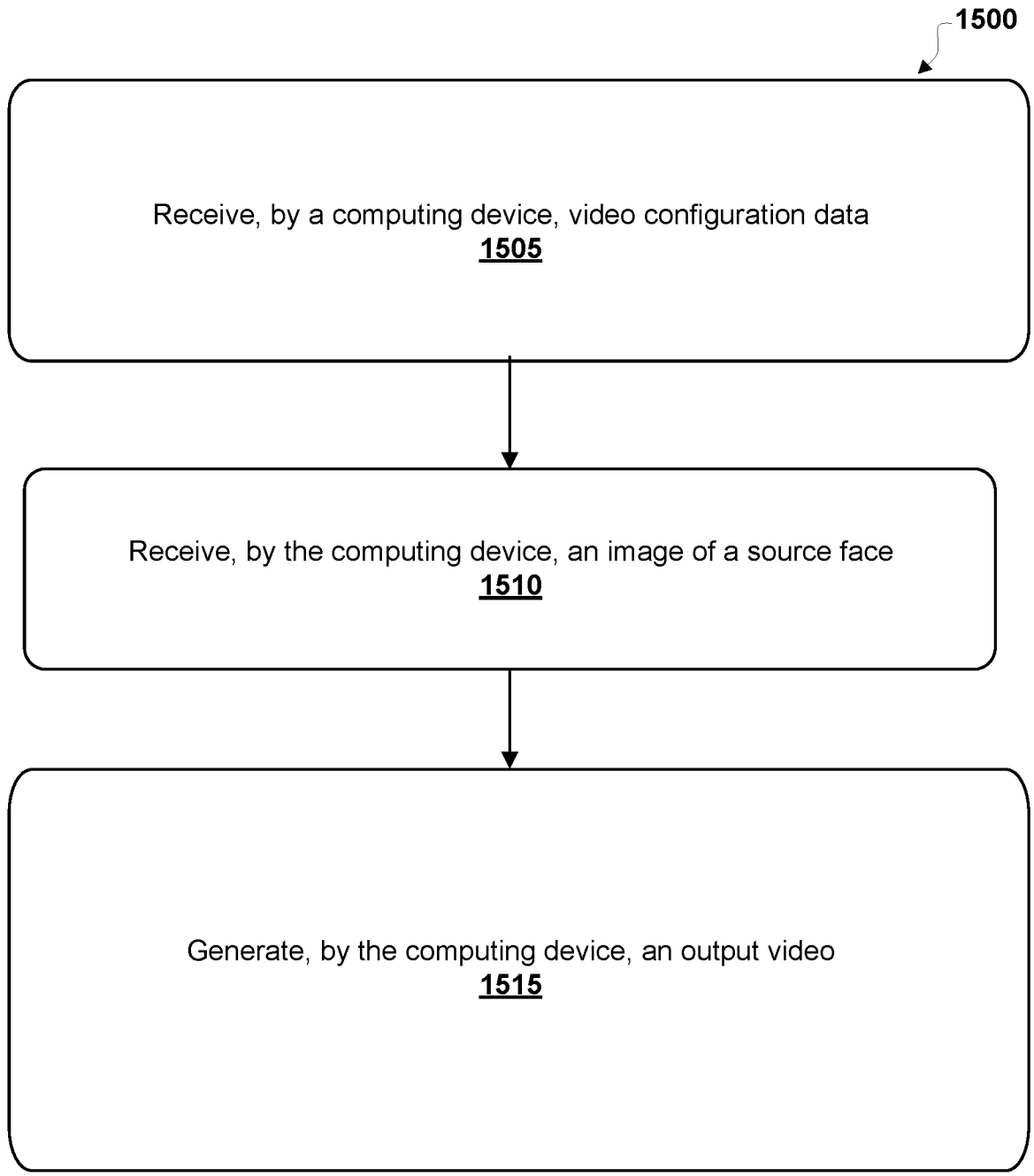
FIG. 15 is a flow chart showing a method for template-based generation of personalized videos, in accordance with an example embodiment.

FIG. 15 is a flow chart showing a method 1500 for template-based generation of personalized videos, according to some example embodiments of the disclosure. The method 1500 can be performed by the computing device 105. The method 1500 may commence with receiving video configuration data at step 1505. The video configuration data may include a sequence of frame images, a sequence of face area parameters defining positions of a face area in the frame images, and a sequence of facial landmark parameters defining positions of facial landmarks in the frame images. Each of the facial landmark parameters may correspond to a facial expression. In an example embodiment, the sequence of frame images may be generated based on an animation video or based on a live action video. The sequence of facial landmark parameters may be generated based on a live action video featuring a face of a facesync actor. The video configuration data may include one or more of the following: a sequence of skin masks defining a skin area of a body of at least one actor featured in the frame images, a sequence of mouth region images where each of the mouth region images corresponds to at least one of the frame images, a sequence of eye parameters defining positions of an iris in a sclera of a facesync actor featured in the frame images, a sequence of head parameters defining a rotation, a scale, a turn, and other parameters of a head, a sequence of animated object images, wherein each of the animated object images corresponds to at least one of the frame images, and so forth.

The method 1500 may continue with receiving an image of a source face at step 1510. The method 1500 may further include generating an output video at step 1515. Specifically, the generation of the output video may include modifying a frame image of the sequence of frame images. The frame image may be modified by modifying the image of the source face to obtain a further image featuring the source face adopting a facial expression corresponding to the facial landmark parameters. The image of the source face may be modified based on facial landmark parameters corresponding to the frame image. The further image may be inserted into the frame image at a position determined by face area parameters corresponding to the frame image. In an example embodiment, the generation of the output video may further optionally include one or more of the following steps: determining color data associated with the source face and recoloring the skin area in the frame image based on the color data, inserting a mouth region corresponding to the frame image into the frame image, generating an image of eyes region based on the eye parameters corresponding to the frame, inserting the image of the eyes region in the frame image, determining a hair mask based on the source face image and generating a hair image based on the hair mask and head parameters corresponding to the frame image, inserting the hair image into the frame image, and inserting an animated object image corresponding to the frame image into the frame image.

Figure 16:
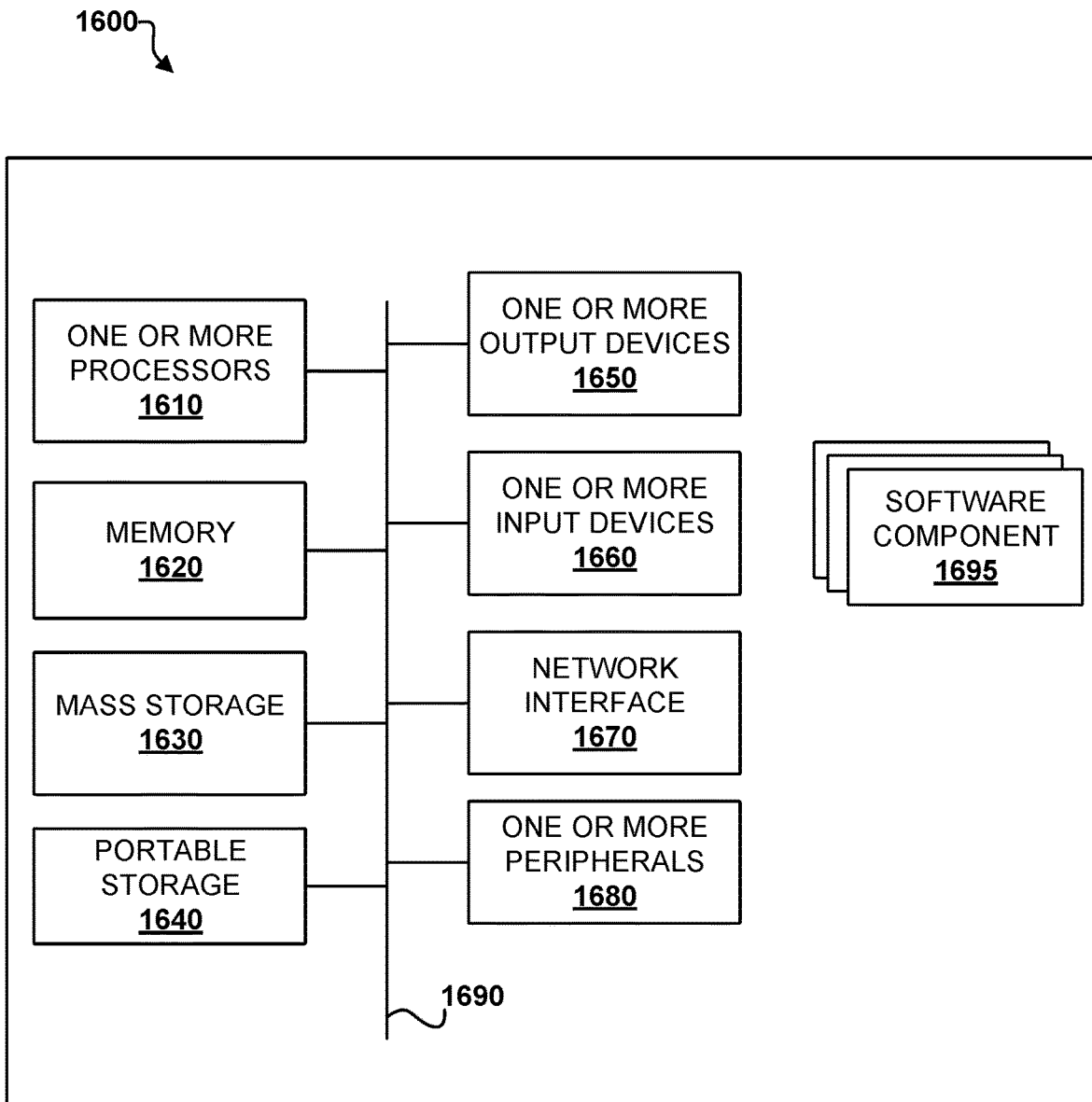
FIG. 16 shows an example computer system that can be used to implement methods for template-based generation of personalized videos.

FIG. 16 illustrates an example computing system 1600 that can be used to implement methods described herein. The computing system 1600 can be implemented in the contexts of the likes of computing devices 105 and 110, the messenger services system 130, the messenger 220, and the system 250 for template-based generation of personalized videos.

As shown in FIG. 16, the hardware components of the computing system 1600 may include one or more processors 1610 and memory 1620. Memory 1620 stores, in part, instructions and data for execution by processor 1610. Memory 1620 can store the executable code when the computing system 1600 is in operation. The computing system 1600 may further include an optional mass storage device 1630, optional portable storage device 1640, one or more optional output devices 1650, one or more optional input devices 1660, an optional network interface 1670, and one or more optional peripherals 1680. The computing system 1600 can also include one or more software components 1695 (e.g., ones that can implement the method for template-based generation of personalized videos as described herein).

The components shown in FIG. 16 are depicted as being connected via a single bus 1690. The components may be connected through one or more data transport means or data network. The processor 1610 and memory 1620 may be connected via a local microprocessor bus, and the mass storage device 1630, peripherals 1680, portable storage device 1640, and network interface 1670 may be connected via one or more input/output (I/O) buses.

The mass storage device 1630, which may be implemented with a magnetic disk drive, solid-state disk drive, or an optical disk drive, is a non-volatile storage device for storing data and instructions for use by the processor 1610. Mass storage device 1630 can store the system software (e.g., software components 1695) for implementing embodiments described herein.

Portable storage device 1640 operates in conjunction with a portable non-volatile storage medium, such as a compact disk (CD), or digital video disc (DVD), to input and output data and code to and from the computing system 1600. The system software (e.g., software components 1695) for implementing embodiments described herein may be stored on such a portable medium and input to the computing system 1600 via the portable storage device 1640.

The optional input devices 1660 provide a portion of a user interface. The input devices 1660 may include an alphanumeric keypad, such as a keyboard, for inputting alphanumeric and other information, or a pointing device, such as a mouse, a trackball, a stylus, or cursor direction keys. The input devices 1660 can also include a camera or scanner. Additionally, the computing system 1600 as shown in FIG. 16 includes optional output devices 1650. Suitable output devices include speakers, printers, network interfaces, and monitors.

The network interface 1670 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1670 may be a network interface card, such as an Ethernet card, optical transceiver, radio frequency transceiver, or any other type of device that can send and receive information. The optional peripherals 1680 may include any type of computer support device to add additional functionality to the computer system.

The components contained in the computing system 1600 are intended to represent a broad category of computer components. Thus, the computing system 1600 can be a server, personal computer, hand-held computing device, telephone, mobile computing device, workstation, minicomputer, mainframe computer, network node, or any other computing device. The computing system 1600 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Figure 17:
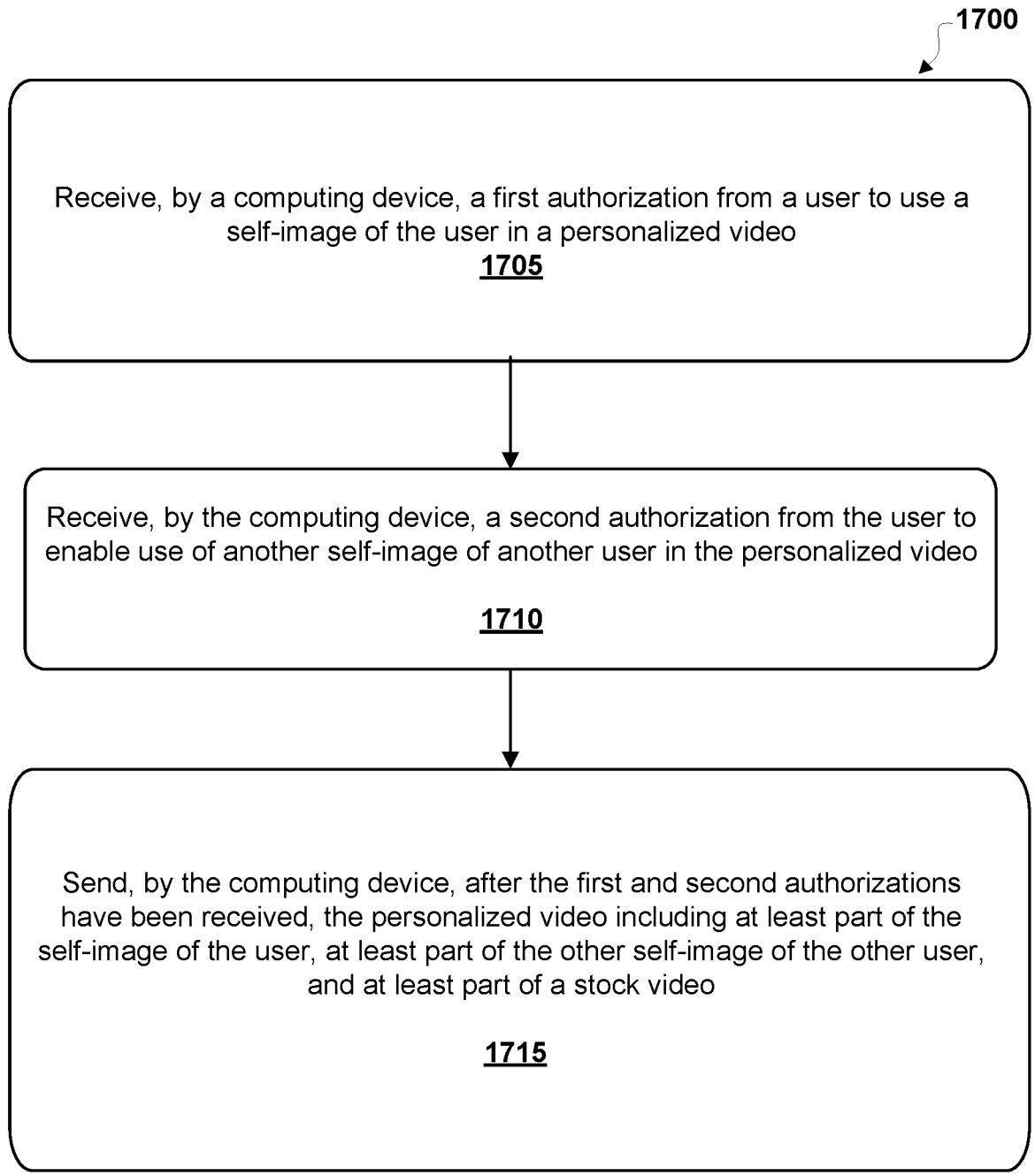
FIG. 17 is a flow chart showing an example method for operating a messaging system adapted to send and receive modifiable videos.

FIG. 17 is a flow chart showing a method 1700 for operating a messaging system adapted to send and receive modifiable videos, according to some example embodiments of the disclosure. The method 1700 can be performed by the computing device 105. The method 1700 may commence at step 1705, which indicates to receive, by a computing device, a first authorization from a user to use a self-image (also referred to as a selfie) of the user in a personalized video. From step 1705, the flow in method 1700 proceeds to step 1710, which indicates to receive, by the computing device, a second authorization from the user to enable use of another self-image of another user in the personalized video. From step 1710, the flow in method 1700 proceeds to step 1715, which indicates to send, by the computing device, after the first and second authorizations have been received, the personalized video including at least part of the self-image of the user, at least part of the other self-image of the other user, and at least part of a stock video (also referred to as a template or template video).

The method 1700 may also include additional method operations. For example, method 1700 may additionally include the steps of sending, by the computing device in response to the receiving of the second authorization, the self-image of the user to another computing device. The other computing device may be associated with the other user. Method 1700 may include the step of receiving, by the computing device from the other computing device, an indication that the other user authorizes the user to use the other self-image of the other user.

Thus, the methods and systems for interfacing with configurations for a communications system including images and videos using self-images from one or more people and including privacy controls have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
   receiving, by a computing device, an authorization from a user to enable use of a self-image of a further user in a personalized video;
   in response to the authorization, sending, by the computing device, the personalized video including at least part of the self-image of the further user and at least part of a stock video to a further computing device associated with the further user;
   receiving, by the computing device, from the further computing device, an indication of whether the further user has authorized using the self-image in the personalized video;
   receiving, by the computing device, a user input from the user;
   based on the user input, generating, by the computing device, at least one of a background and a foreground; and
   adding, by the computing device, the at least one of the background and the foreground to the personalized video.

2. The method of claim 1, further comprising, prior to the sending the personalized video:
   receiving, by the computing device, a text typed by the user;
   synthesizing, by the computing device, a voice reading the text; and
   adding, by the computing device, the voice to the personalized video.

3. The method of claim 1, further comprising, prior to the sending the personalized video:
   receiving, by the computing device, a text typed by the user;
   synthesizing, by the computing device, a voice singing the text; and adding, by the computing device, the voice to the personalized video.

4. The method of claim 1, further comprising, prior to the sending the personalized video, modifying, by the computing device, a voice present in the personalized video to match a voice of the user.

5. The method of claim 1, further comprising, prior to the sending the personalized video, switching, by the computing device, a gender of a body of an actor present in the personalized video.

6. The method of claim 1, further comprising:
receiving, by the computing device, from the further user, a user command to delete the self-image; and
in response to the receiving the user command, deleting, by the computing device, the self-image on the computing device, the computing device being associated with the user.

7. The method of claim 1, further comprising:
receiving, by the computing device, from the further user, a user command to delete the self-image; and
in response to the receiving the user command, sending, by the computing device to the further computing device, a command to delete the self-image on the further computing device.

8. The method of claim 1, wherein the personalized video includes a modified self-image produced based on the self-image, the modified self-image being adjusted to adopt a facial expression corresponding to facial landmark parameters, the modified self-image being inserted in the stock video at a position determined by face area parameters.

9. The method of claim 1, wherein the computing device is a mobile computing device.

10. A computing device comprising:
a processor; and
a memory storing instructions that, when executed by the processor, configure the computing device to:
receive an authorization from a user to enable use of a self-image of a further user in a personalized video;
in response to the authorization, send the personalized video including at least part of the self-image of the further user and at least part of a stock video to a further computing device associated with the further user;
receive, from the further computing device, an indication of whether the further user has authorized using the self-image in the personalized video;
receive a user input from the user;
based on the user input, generate at least one of a background and a foreground; and
add the at least one of the background and the foreground to the personalized video.

11. The computing device of claim 10, wherein the instructions further configure the computing device to, prior to the sending the personalized video:
receive a text typed by the user;
synthesize a voice reading the text; and
add the voice to the personalized video.

12. The computing device of claim 10, wherein the instructions further configure the computing device to, prior to the sending the personalized video:
receive a text typed by the user;
synthesize a voice singing the text; and
add, by the computing device, the voice to the personalized video.

13. The computing device of claim 10, wherein the instructions further configure the computing device to, prior to the sending the personalized video, modify, by the computing device, a voice present in the personalized video to match a voice of the user.

14. The computing device of claim 10, wherein the instructions further configure the computing device to, prior to the sending the personalized video, switch a gender of a body of an actor present in the personalized video.

15. The computing device of claim 10, wherein the instructions further configure the computing device to:
receive from the further user, a user command to delete the self-image; and
in response to the receiving the user command, delete the self-image on the computing device, the computing device being associated with the user.

16. The computing device of claim 10, wherein the instructions further configure the computing device to:
receive from the further user, a user command to delete the self-image; and
in response to the receiving the user command, send, to the further computing device, a command to delete the self-image on the further computing device.

17. The computing device of claim 10, wherein the personalized video includes a modified self-image produced based on the self-image, the modified self-image being adjusted to adopt a facial expression corresponding to facial landmark parameters, the modified self-image being inserted in the stock video at a position determined by face area parameters.

18. A non-transitory computer-readable storage medium, the computer-readable storage medium including instructions that, when executed by a computing device, cause the computing device to:
receive an authorization from a user to enable use of a self-image of a further user in a personalized video;
in response to the authorization, send the personalized video including at least part of the self-image of the further user and at least part of a stock video to a further computing device associated with the further user;
receive, from the further computing device, an indication of whether the further user has authorized using the self-image in the personalized video;
receive a user input from the user;
based on the user input, generate at least one of a background and a foreground; and
add the at least one of the background and the foreground to the personalized video.

19. The non-transitory computer-readable storage medium of claim 18, wherein the instructions further cause the computing device to, prior to the sending the personalized video:
receive a text typed by the user;
synthesize a voice reading the text; and
add the voice to the personalized video.

20. The non-transitory computer-readable storage medium of claim 18, wherein the instructions further cause the computing device to, prior to the sending the personalized video:
receive a text typed by the user;
synthesize a voice singing the text; and
add the voice to the personalized video.

* * * * *